May 15, 1934. H. L. JEFFERY ET AL 1,959,055
LIGHT REFLECTING DEVICE
Filed April 25, 1931
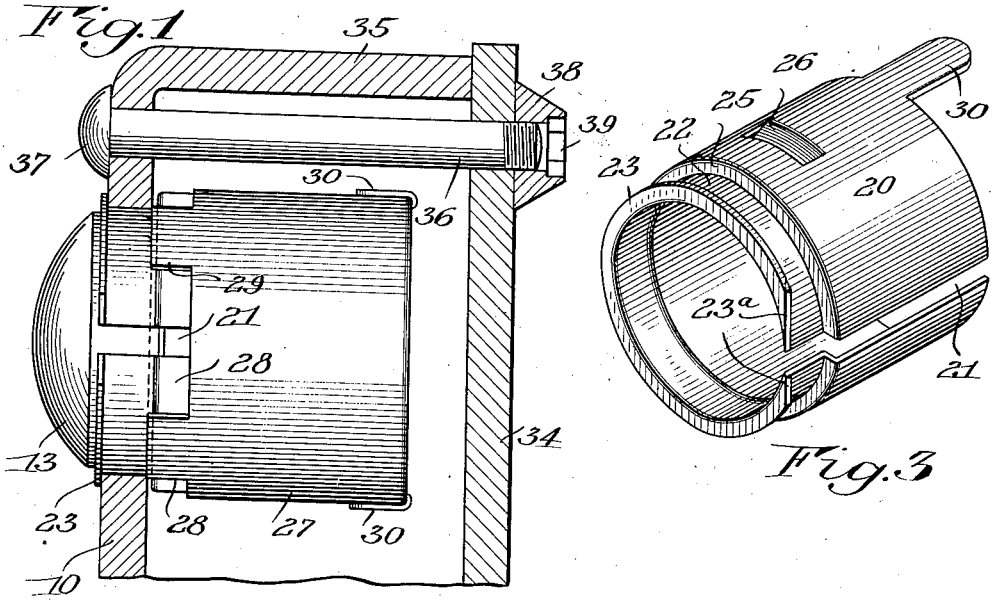
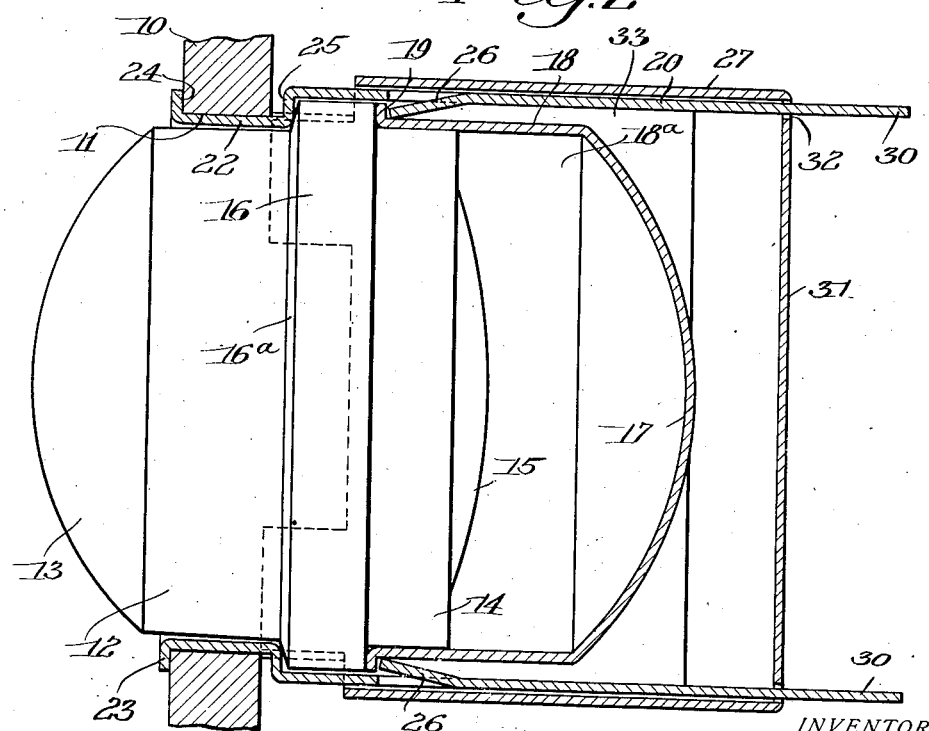
INVENTORS
Harold L. Jeffery
Charles D. Ryder
BY Edward H. Cumpston
their ATTORNEY Patented May 15, 1934

1,959,055

UNITED STATES PATENT OFFICE 1,959,055

LIGHT REFLECTING DEVICE

Harold L. Jeffery, Fort Thomas, and Charles D. Ryder, Covington, Ky., assignors to The National Colortype Company, Bellevue, Ky., a corporation of Kentucky Application April 25, 1931, Serial No. 532,870

17 Claims. (Cl. 88—1)

The present invention relates to a light reflecting device of the kind which may be used for example, in connection with various types of signs, advertisements, and the like, which are intended to be rendered visible at night by reflected light from an external source. Light reflecting devices of this general type may be employed for example to form highway or warning signals which are rendered visible by the light reflected from the headlights of motor vehicles approaching the signs at night.

One object of the invention is to provide in a device of this class, improvements which afford a simplified and efficient construction of a durable and practical nature.

Another object of the invention is the provision of improved mounting means for the light reflecting elements designed to compensate for variations in thickness of the plates or other supporting members upon which the mounts are secured.

Still another object of the invention is to provide improved holding means for the reflecting elements designed to prevent dislodgment of the same under pressure applied to the exposed portions thereof when in assembled position.

Another object of the invention is the provision of improved securing and protecting means for the reflecting elements which serve to rigidly secure them in position while at the same time preventing injury to certain parts thereof by pressure or contact from external means either during or after assembly of the parts.

A further object of the invention is the provision of improved means designed to accurately position the reflecting elements upon the supporting means therefor without possibility of accidental displacement and which will prevent them from being tampered with or removed by unauthorized persons.

Still another object of the invention is the provision of a light reflecting device embodying relatively few parts which are easy to assemble and secure in position, the construction being designed particularly with the idea in view of a simplified low-cost device of this class.

To these and other ends the invention resides in certain improvements and combinations of parts, all as will be hereinafter more fully described, the novel features being pointed out in the claims at the end of the specification.

In the drawing:

Fig. 1 is a fragmentary vertical section through a portion of a light reflecting device constructed in accordance with a preferred embodiment of the invention;

Fig. 2 is an enlarged sectional elevation showing the parts of one of the light reflecting units in partially assembled relation, and Fig. 3 is a perspective view of a securing or retaining element for the lens in the form of a tubular mount.

Similar reference numerals throughout the several views indicate the same parts.

According to the preferred embodiment of the invention, a support 10 is provided preferably in the form of a plate upon which may be secured a desired number of light reflecting elements arranged in any preferred order corresponding to a selected design, or disposed in such a manner as to constitute letters or words forming useful signs or advertisements. In the present instance only one of the light reflecting elements is illustrated, the others preferably being identical with the one shown. The reflecting elements each comprise one or more lens members and a reflecting mirror or mirror-like surface.

The support is provided with apertures 11 corresponding in number to the number of reflecting elements required to complete the sign. One side of the support is accessible while the opposite side is preferably rendered relatively inaccessible to unauthorized persons, by means described hereinafter.

Mounted within the aperture of the support is a light projecting lens member having a portion 12 provided with a front or light receiving face 13 and a portion 14 having a rear face 15. Between the front and rear portions, the lens member is provided with an annular portion 16 of greater diameter than the body of the lens and provided for a purpose described hereinafter.

A reflector 17 is mounted in proper cooperative relation to the lens member at the back thereof. The reflector may comprise, for example, either a silvered or polished piece of metal suitably curved and supported with respect to the lens member. The reflector is preferably formed integral with an inner tubular or sleeve-like member 18, which receives the rear portion 14 of the lens member as shown in Fig. 2. The sleeve is preferably secured to the lens member by means of a suitable cement or like material not shown, so that the sleeve becomes in effect a part of the light reflecting element. The sleeve and reflector when applied in this manner afford a sealed, substantially air tight chamber 18a between the rear portion of the lens member and the reflector, thereby reducing the tendency of the reflector to tarnish by protecting it from atmospheric conditions. The sleeve is preferably provided with an outwardly turned flange 19 which abuts the rear side of the annular shoulder 16 of the lens member as shown in Fig. 2.

One or both of the surfaces 13 and 15 of the lens member are of convex lenticular shape, and one or both of these surfaces are also preferably of aspherical shape to correct for spherical aberration, and these surfaces and the reflector 17 are arranged to afford maximum reflection of light incident on the front face 13, as set forth, for example, in the copending application of Evan P. Bone, Serial No. 453,378, filed May 17, 1930, for Light reflecting device.

The complete reflecting unit above described is disposed within a mount or holder indicated generally at 20 and shown, in perspective in Fig. 3. This mount is preferably of an expansible character and so constructed that when one end has been slightly contracted and inserted within the aperture of the support 10, and expanded, it will move into locking engagement with the support to secure the mount against axial displacement in one direction. The mount 20 is preferably constructed of sheet metal formed into a curved or annular body, split or divided at 21, preferably, for its entire length, and having at one end a reduced portion 22 providing a shoulder or flange-like portion 23 for engagement with an abutment on the support 10, such for example, as the front face portion 24 of the support. The reduced end portion 22 is connected with the main body portion of the mount by a similar flange or transverse wall 25, the inner face of which forms an abutment or seat for the front edge 16a of the annular shoulder 16 of the lens member, said front edge preferably being slightly beveled, as shown in Fig. 2. The portion 22 of the mount has a close fit with the wall of the support to prevent side or lateral play of the mount. The flange 23 is cut away at 23a to facilitate the operation of temporarily contracting the mount 20 to reduce the diameter of the flange sufficiently to permit it to be inserted through the opening 11 of the support 10 when assembling the mount upon the support.

The mount is provided with suitably formed lugs or abutments 26 for engagement with the flange portion 19 of the reflector sleeve 18 to hold the front face of the shoulder 16 of the lens member seated upon the transverse wall portion 25 of the mount. The lugs 26 are preferably formed by striking inwardly portions of the wall of the mount as shown in Figs. 2 and 3. With this form of construction the parts 26 may if desired constitute yieldable tongue-like members which while the lens member is being moved to final position within the mount can be forced outwardly by the shoulder portion 16 thereof to snap back into the locking position shown in Fig. 3 when the lens member reaches said final position, in which it is firmly held against rearward displacement by the lugs 26. It will be understood, however, that with the mount made expansible as shown, the lugs 26 need not necessarily be of a yieldable nature since the rear portion of the body of the mount can be expanded sufficiently to allow the shoulder 16 on the lens member to move into position between the lugs and the wall portion 25 on the mount, at which time said rear portion of the mount will contract so that the parts will assume the position shown in Fig. 2. However, either or both of these methods of securing the lens member within the mount may be employed if desired.

It will be noted that the length of the front portion 22 of the mount is somewhat greater than the thickness of the support or plate 10 so that it will accommodate itself to plates varying in thickness within certain limits.

The means by which the mount is secured in position upon the support preferably comprises a single retaining element in the form of a compensating ferrule or coupling 27 sleeved upon the mount. The front end of the ferrule is cut away to afford openings 28 for a purpose hereinafter described, as well as to provide spaced members 29 for engagement with the rear face of the support when the retaining element is in position to clamp the mount upon the support as shown in Fig. 1. The means for securing the retaining element in position to clamp the mount upon the support comprises one or more parts preferably formed integral with the mount, such for example as the tongue-like members 30 on the rear end of the mount which are preferably bent backwardly and downwardly upon the retaining element while its front end is held in engagement with the support, in which position said element is firmly secured by the clamping action of the parts 30 when in the position shown in Fig. 1. It will be evident that this form of retaining means will compensate for supports varying in thickness within certain limits and that when the parts are once assembled they are rigidly and accurately held in proper position.

The retaining element is preferably closed at its rear end by a wall 31 slotted at 32 for the passage therethrough of the retaining portions 30 on the lens mount. If desired, the members 30 may be bent downwardly upon the wall 31 rather than upon the side wall of the retaining element, but it is preferred to bend them back and downwardly as shown in Fig. 1.

The end wall 31 of the retaining element serves to close the chamber 33 of the mount in which the reflector is disposed and also to protect the reflector from injury by preventing pressure thereon from external sources, or from being struck, through careless handling of the tools or implements which may be employed in securing the parts upon the support. The chamber 33 being closed by the end wall 31 is also protected against the accumulation of dirt and other foreign matter.

By providing the openings 28 between the plate-engaging portions 29 of the retaining element the greater part of the area of that portion of the mount adjacent the inner face of the support 10 is left uncovered so that any particles of moisture which may find their way through the aperture 11 around the mount to said surface will more quickly and readily evaporate by being exposed to the air within the casing containing the mounts. Removal of the lens member from the mount when the retaining element has been detached can be effected by the use of a special tool inserted between the wall 18 of the reflector and that of the mount to expand the latter or to force the lugs 26 outwardly so as to permit the lens member to be moved rearwardly to release position. Removal of the retaining member can readily be effected by using a suitable tool to bend back the tongues 30 into the position shown in Fig. 3 to permit withdrawal of said retaining member.

In order to render the retaining elements inaccessible so that unauthorized persons cannot readily detach the holding parts and remove the lens members, a casing is provided for enclosing said elements, as shown in Fig. 1. The casing is formed by providing either the front wall 10 or the rear wall 34 with a marginal flange 35, and clamping them one upon another by means of a suitable number of bolts 36. Each of the bolts is provided with a smooth rounded head 37 which cannot be grasped readily either by a wrench or by a pair of pliers. The opposite end of the bolt is provided with a nut 38 of a peculiar shape which cannot readily be unscrewed by the use of tools ordinarily available to unauthorized persons. For example, the nut is provided with an outer conical surface and a polygonal recess 39 in which a special wrench may be inserted to tighten or unscrew the nut. Thus the closure is rendered relatively inaccessible whereby boys and others, not provided with the necessary tools for removal of the closure, are prevented from tampering with or removing the lens members and associated parts. The effectiveness of the sign is thus increased by the protection afforded against interference by unauthorized persons. On the other hand an authorized person having the required special tool to fit the nut 38 may easily and quickly remove the closure plate 35 and obtain access to the reflecting elements so that they may be quickly removed when found imperfect and replaced or repaired as required.

When the reflecting elements have been properly assembled and secured, the shoulders 23 on the front ends of the mounts are tightly clamped in engagement with the support thus affording a substantially sealed joint between the parts whereby to more effectively protect the interior portions of the device against rain or moisture when subjected to adverse weather conditions. It will be seen, therefore, that by securing the various light reflecting units in the manner described that they are accurately and rigidly held in proper alinement and against accidental displacement in either direction.

In operation, light from any external source will enter the light receiving lens surface 13 and pass through the aperture and through the rear lens face 15 to the reflecting element, by which it is reflected back through the lens and to the eye of the person observing the sign. It will be apparent, therefore, that those operating motor vehicles of any kind on approaching the sign at night with their headlights illuminated will receive the necessary warning by reason of the reflected light rays of the sign.

From the above description it will be seen that with the present construction the mounting of the light reflecting elements is comparatively simple and that when they have been properly assembled and secured they are rigidly held both against axial and lateral displacement, or tilting to shift their axes relative to the support, and cannot be removed except by the use of the proper tools and then only by first removing the cover plate at the rear of the casing. The simplicity of the construction will be further apparent when it is remembered that the reflecting device constitutes but three elements, namely, the reflecting unit, the mount in which it is enclosed, and the retaining element surrounding the mount. It will be seen, therefore, that it is not necessary to employ springs, clips, or other additional parts as used in some prior constructions, since with the present arrangement the parts are so designed as to cooperate one with another to secure and maintain them in proper position upon the support.

While one embodiment of the invention has been shown and described, it is to be understood that the inventive idea may be modified and carried out in other ways without departing from the spirit of the invention or the scope of the appended claims.

We claim:

1. A light reflecting device comprising a support having an abutment thereon, a lens mount having an expansible portion arranged for locking engagement with the abutment to hold the mount against displacement in one direction, a retaining member movable upon the mount into engagement with the support to secure the mount against displacement in another direction, and lens means within the mount serving to hold said portion expanded into cooperative locking engagement with the abutment.

2. A light reflecting device comprising a support having an abutment thereon, a lens mount having a part engaging the abutment to hold the mount against axial displacement in one direction, said mount having inwardly disposed portions spaced from said part, a lens member within the mount engaging said inwardly disposed portions whereby the lens member is held against axial displacement in opposite directions, and a rigid retaining member inserted upon the mount and engaging the support to secure the mount thereon.

3. A light reflecting device comprising a support having an abutment thereon, a tubular lens mount having a part engaging the abutment to hold the mount against axial displacement in one direction, said mount having spaced inwardly extending parts, a lens element within the mount having a shoulder disposed between said inwardly extending parts whereby the lens member is held against axial movement in opposite directions, and retaining means inserted upon the mount and engaging the support to secure the mount thereon.

4. A light reflecting device comprising a support having an aperture therein, a lens mount having an end portion disposed within the aperture and arranged for cooperation with the support to hold the mount against displacement in one direction, a lens member within the mount held thereby against axial displacement in one direction, an inwardly struck part on the mount cooperating with the lens member to hold it against axial displacement in an opposite direction, and retaining means for the mount engaging the latter and the support to secure the mount thereon.

5. A light reflecting device comprising a support having an abutment thereon, an expansible lens mount having a portion engaging the abutment to hold the mount against axial displacement in one direction, said expansible mount having inwardly disposed parts spaced one in advance of another, a lens member having a shoulder thereon, said lens member when inserted within the mount operating to expand it sufficiently to permit the shoulder to move into position between said inwardly disposed parts whereby the lens member is held against axial displacement in opposite directions, and retaining means on the mount engaging the support to secure the mount thereon.

6. A light reflecting device comprising a support having an abutment thereon, a lens mount having an expansible portion for cooperation with the abutment to hold the mount against displacement in one direction, lens means movable in one direction to a predetermined position within the mount at which it serves to hold said portion expanded in engagement with the abutment, said mount having means projecting therein and permitting the lens means to be moved axially in said direction to said predetermined position and serving when it has been moved to said position to secure it against axial movement in an opposite direction, and retaining means engaging the support and a part on the mount to hold the mount against displacement in one direction.

7. A light reflecting device comprising a support having an aperture therein, a lens mount having a portion disposed within the aperture and arranged for expansion into locking engagement with the support to hold the mount against displacement in one direction, lens means insertible within the mount to expand said portion into locking engagement with the support, said mount having means thereon permitting the lens means to be moved in one direction to expand said portion and serving to secure it against movement in an opposite direction, and means engaging the support and the mount to hold the latter against displacement upon the support.

8. A light reflecting device comprising a support having an aperture therein, a split lens mount having an end portion disposed within the aperture and provided with a shoulder engaging one side of the support, said mount having a transverse wall portion at the opposite side of the support and an inwardly extending part spaced from said wall portion, a lens member within the mount having a shoulder projecting between said transverse wall portion and said inwardly extending part whereby the lens member is held against axial displacement in opposite directions, and a rigid retaining element on the mount engaging the support to secure the mount thereon.

9. A light reflecting device comprising a support having an aperture therein, a tubular lens mount split throughout its length having an end portion disposed within the aperture and provided with a shoulder engaging the front of the support to hold the mount against axial displacement in one direction, said mount having front and rear inwardly disposed portions at the rear side of the support, a lens member within the mount extending forwardly and rearwardly of said portions and having an annular shoulder disposed therebetween whereby the lens member is held against axial displacement in opposite directions, and retaining means on the mount engaging the support to secure the mount thereon.

10. A light reflecting device comprising a support having an abutment thereon, a tubular mount having a lens chamber, said mount having a shoulder engaging the abutment to hold the mount against axial displacement in one direction, a lens member secured within the chamber, and a retaining member inserted upon the mount having an end wall closing one end of the chamber, said wall having an aperture therein and said mount having a part thereon extending through said aperture and bent down into engagement with the mount to lock the retaining member and mount against relative movement.

11. A light reflecting device comprising a support having an aperture therein, a tubular mounting element provided with a lens chamber and having one end disposed within the aperture in engagement with the support and held by the latter against axial displacement in one direction, a lens member secured within the chamber, a reflector within the chamber engaging the lens member to hold it against displacement in one direction, a part extending inwardly from the mounting element in engagement with the reflector to hold it upon the lens member, and a sleeve-like retaining element inserted upon the mounting element and having one end engaging the support and the other provided with an end wall serving to close one end of said chamber, one of said elements having integrally formed securing means thereon engaging the other element whereby said elements are rigidly secured upon the support.

12. A light reflecting device comprising a support having an aperture therein, a tubular mounting element provided with a lens chamber and having one end disposed within the aperture in engagement with the support and held by the latter against axial displacement in one direction, a lens member secured within the chamber, and a rigid sleeve-like retaining element inserted upon the mounting element and having one end engaging the support and the other provided with an end wall serving to close one end of said chamber, said wall having openings therein and said tubular mounting element having extending tongue-like portions projecting through the openings and bent down upon the retaining element whereby to rigidly secure said elements upon the support.

13. A light reflecting device comprising a support having an abutment at one side thereof, a tubular mount having a chamber therein, said mount provided with a shoulder engaging the abutment to hold the mount against axial displacement in one direction, a lens member secured within the mount, a reflector disposed within said chamber upon said lens member, means on the mount for holding the reflector and lens member against axial displacement, a retaining member inserted upon the mount and having an end wall closing said chamber to protect said reflector, said retaining member engaging the support at the side opposite the abutment to secure the mount thereon, and a part on the mount extending through the end wall of the retaining member and serving to hold the retaining member against axial displacement.

14. A light reflecting device comprising a support having an aperture therein, a lens mount having a portion disposed within the aperture and provided with a shoulder engaging the support to hold the mount against axial displacement in one direction, said mount having an abutment on its inner face, a lens member within the mount having a shoulder seated upon said abutment, a reflector disposed in cooperative relationship with respect to said lens member and having a sleeve-like supporting portion inserted upon the lens member, means projecting inwardly of the mount and serving to hold the lens member in position to maintain the shoulder thereon in engagement with said abutment, and a sleeve-like retaining element inserted upon the mount having a closure at one end for protecting the reflector, the opposite end of the retaining member engaging the support to secure the mount thereon.

15. A light reflecting device for application to supports of different thicknesses, comprising rigid compensating telescoping elements for engaging the supports at different sides thereof, said elements having cooperating means including parts for holding the elements against relative rotation, a part on one of the elements being movable to engage another of the elements after the elements have been moved into engagement with the supports whereby to clamp the elements upon the supports of different thicknesses, said part adapted to hold one of the elements against axial displacement upon another, and a light reflecting lens carried by one of the elements.

16. A light reflecting device for application to supports of different thicknesses, comprising rigid compensating telescoping elements for engaging the supports at different sides thereof, a light reflecting lens carried by one of the elements, one of said elements having an end wall and the other element having means thereon extending through said wall and cooperating therewith to rigidly clamp the elements upon the supports of different thicknesses and to hold them against axial displacement upon the supports.

17. A light reflecting device comprising a support having an aperture therein, a lens mounting element having a portion extending through the aperture and provided with a shoulder engaging one side of the support, a lens member secured within the mounting element, a rigid retaining element inserted on the mounting element without rotation and engaging the support at the side opposite that engaged by the shoulder, one of said elements having securing means thereon extending through an opening in the wall of the other element and serving to rigidly hold the elements upon the support against axial displacement thereon.

HAROLD L. JEFFERY.
CHARLES D. RYDER.